United States Patent
Motwani et al.

(10) Patent No.: US 9,411,818 B2
(45) Date of Patent: *Aug. 9, 2016

(54) COMMAND LINE INTERPRETER FOR ACCESSING A DATA OBJECT STORED IN A DISTRIBUTED STORAGE NETWORK

(71) Applicant: CLEVERSAFE, INC., Chicago, IL (US)

(72) Inventors: Manish Motwani, Chicago, IL (US); S. Christopher Gladwin, Chicago, IL (US); Jesse Louis Young, Woodstock, IL (US); Matthew Michael England, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,504

(22) Filed: Jul. 23, 2014

(65) Prior Publication Data

US 2014/0344284 A1   Nov. 20, 2014

Related U.S. Application Data

(63) Continuation of application No. 12/839,209, filed on Jul. 19, 2010, now Pat. No. 8,819,011, which is a continuation-in-part of application No. 12/218,594, filed on Jul. 16, 2008, now Pat. No. 7,962,641.

(60) Provisional application No. 61/256,436, filed on Oct. 30, 2009.

(51) Int. Cl.
*G06F 12/00*   (2006.01)
*G06F 17/30*   (2006.01)
*H04L 29/08*   (2006.01)
*G06F 11/10*   (2006.01)

(52) U.S. Cl.
CPC .... *G06F 17/30194* (2013.01); *G06F 17/30386* (2013.01); *H04L 67/1097* (2013.01); *G06F 11/1008* (2013.01); *G06F 2211/1059* (2013.01)

(58) Field of Classification Search
CPC ............ G06F 11/3034; G06F 12/0824; G06F 17/30197; G06F 3/067; G06F 17/30194; G06F 17/30386; G06F 2211/1059; G06F 11/1008
USPC .......... 707/736, 781, 802, 770, 827, 999.001, 707/999.002, 999.101
See application file for complete search history.

(56) References Cited

U.S. PATENT DOCUMENTS 4,430,699 A  *  2/1984  Segarra et al. ................ 709/230
5,485,474 A  *  1/1996  Rabin ............................ 714/762
6,356,863 B1 *  3/2002  Sayle .............................. 703/27

(Continued)

*Primary Examiner* — Mohammed R Uddin
(74) *Attorney, Agent, or Firm* — Garlick & Markison; Timothy W. Markison

(57) ABSTRACT

A user device includes a DSN interface operably coupled with a DSN memory and a DS processing module for storing and retrieving a data object from the DSN memory, wherein the data object is partitioned into a plurality of data segments and wherein each of the plurality of data segments is stored in the DSN memory as a plurality of encoded data slices that are generated based on an error encoding dispersal function. The user device also includes a command line interpreter operable to interpret a file command as a request to display the data object by an application program, determine the data object is stored in the DSN memory and request the DSN processing module to retrieve the data object from the DSN memory and provide the data object to the application program.

18 Claims, 13 Drawing Sheets

(56) References Cited

U.S. PATENT DOCUMENTS

| | | | |
|---|---|---|---|
| 6,886,160 B1* | 4/2005 | Lee | 717/173 |
| 2001/0014892 A1* | 8/2001 | Gaither et al. | 707/200 |
| 2003/0033308 A1* | 2/2003 | Patel et al. | 707/10 |
| 2005/0210055 A1* | 9/2005 | Rogers et al. | 707/101 |
| 2005/0210076 A1* | 9/2005 | Rogers et al. | 707/200 |
| 2008/0209025 A1* | 8/2008 | Agetsuma et al. | 709/223 |
| 2008/0263222 A1* | 10/2008 | Matsuzawa et al. | 709/238 |
| 2009/0024752 A1* | 1/2009 | Shitomi | 709/230 |

* cited by examiner computing system 10

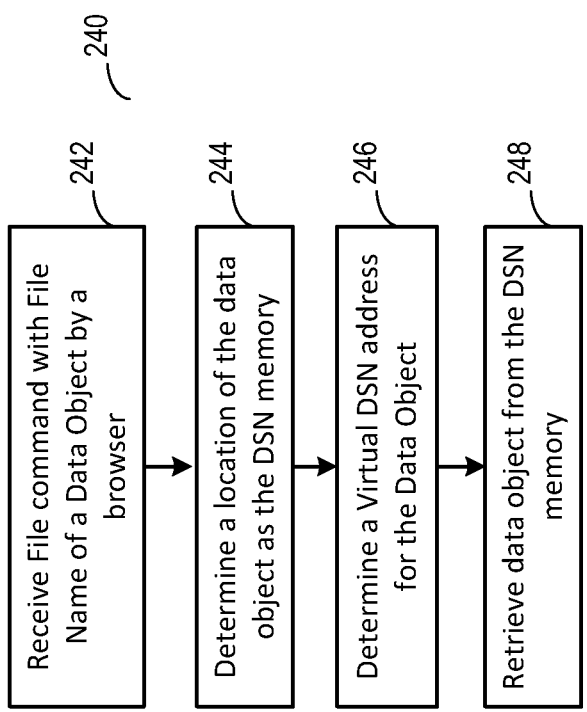

COMMAND LINE INTERPRETER FOR ACCESSING A DATA OBJECT STORED IN A DISTRIBUTED STORAGE NETWORK

CROSS-REFERENCE TO RELATED PATENTS

The present U.S. Utility Patent Application claims priority pursuant to 35 U.S.C. §120 as a continuation of U.S. Utility application Ser. No. 12/839,209, entitled "COMMAND LINE INTERPRETER FOR ACCESSING A DATA OBJECT STORED IN A DISTRIBUTED STORAGE NETWORK", filed Jul. 19, 2010, which claims priority pursuant to 35 U.S.C. §119(e) to U.S. Provisional Application No. 61/256,436 entitled "DISTRIBUTED STORAGE NETWORK ACCESS," filed Oct. 30, 2009, pending, which is incorporated by reference herein in its entirety and made part of the present U.S. Utility Patent Application for all purposes.

U.S. Utility patent application Ser. No. 12/839,209 claims priority pursuant to 35 U.S.C. §120 as a continuation-in-part of U.S. Utility application Ser. No. 12/218,594 entitled, "STREAMING MEDIA SOFTWARE INTERFACE TO A DISPERSED DATA STORAGE NETWORK," which is incorporated by reference herein in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to computing systems and more particularly to data storage within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming, etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally. This increased storage of information content increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n-1=capacity). RAID 6 can recover from a loss of two discs and requires a minimum of four discs with a storage capacity of n-2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 8 is a logic flow diagram of an embodiment of a method for retrieving a data object from a DSN memory in accordance with the invention;

FIG. 9 is a schematic block diagram of an embodiment of a file name in accordance with the invention;

DETAILED DESCRIPTION OF THE INVENTION

Figure 1:
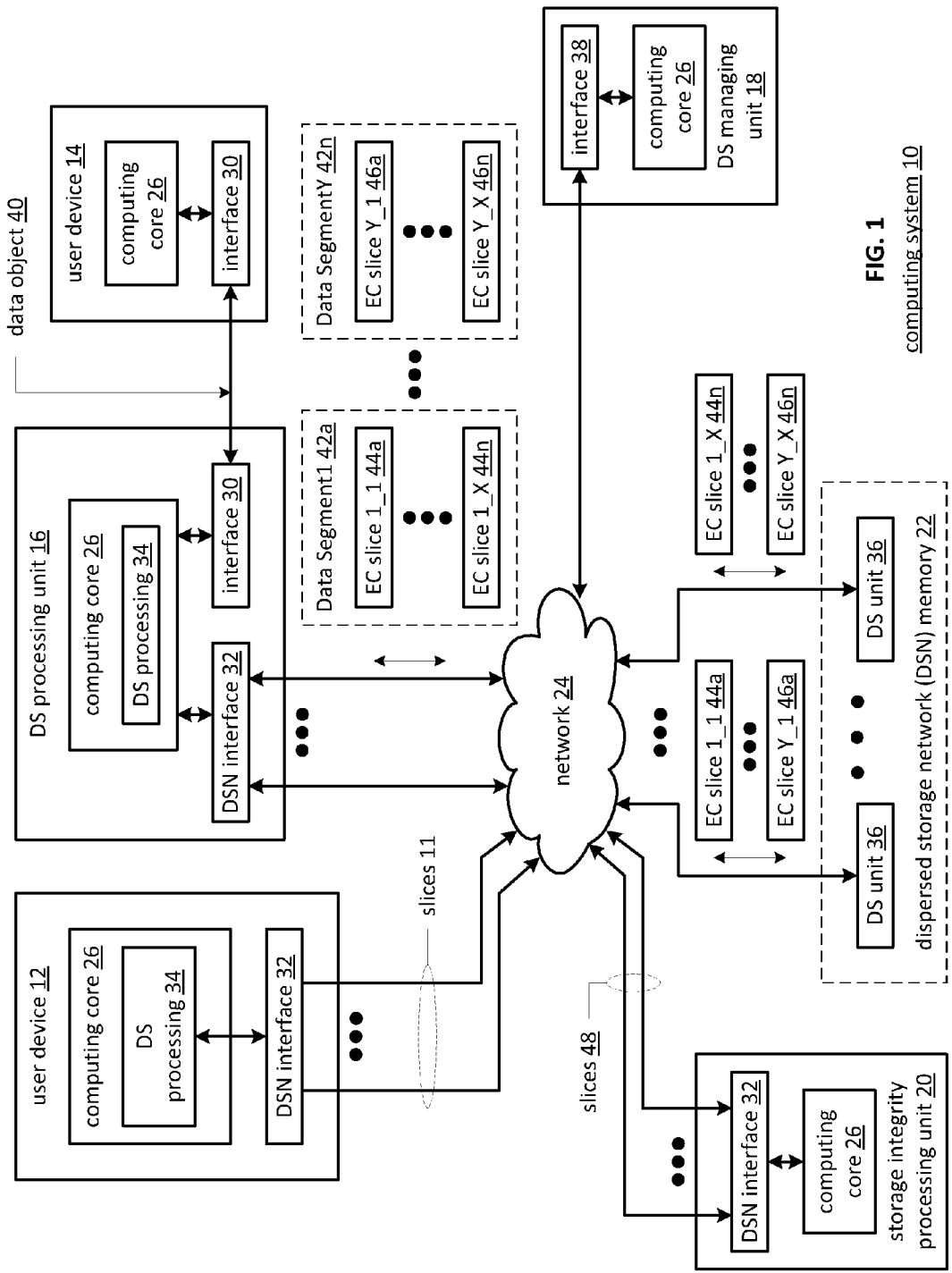
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-15.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 38. An embodiment of the computing core 26 will be described with reference to FIG. 2.

With respect to the interfaces, each of the interfaces 30, 32, and 38 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 38 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data object 40, such as a data file and/or data block, to store in the DSN memory 22, it sends the data object 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data object 40.

The DS processing unit 16 receives the data object 40 via its interface 30 and performs a distributed storage (DS) process 34 thereon (e.g., an error coding dispersal storage function). The DS processing 34 begins by partitioning the data object 40 into one or more data segments, which is represented as Y data segments. The DS processing 34 may partition the data object 40 into fixed byte size segments (e.g., 21 to 2n bytes, where n=>2) or variable byte size segments (e.g., change byte size from segment to segment, or from groups of segments to groups of segments, etc.).

For example, in FIG. 1 for each of the Y number of data segments 42a-n, the DS processing 34 error encodes (e.g., forward error correction (FEC), information dispersal algorithm, or error correction coding) and slices (or slices then error encodes) the data segments 42a-n into a plurality of error coded (EC) data slices 42a-42n and 46a-46n, which are represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an X/T system, then a data segment is divided into X number of slices, where T number of slices are needed to reconstruct the original data (i.e., T is the threshold). As a few specific examples, the X/T factor may be 5/3; 6/4; 8/6; 8/5; 16/10.

For each slice 44a-n and 46a-n, the DS processing unit 16 creates a unique slice name and appends it to the corresponding slice. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 44a-n and 46a-n to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 44a-n and 46a-n for transmission via the network 24.

The number of DS units 36 receiving the slices 44a-n and 46a-n is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice 44a and 46a of each of the data segments 42a-n is to be stored in a first DS unit 36, the second slice 44b and 46b of each of the data segments 42a-n is to be stored in a second DS unit 36, etc. In this manner, the data is encoded and distributedly stored at physically diverse locations to improve data storage integrity and security. Further examples of encoding the data segments will be provided with reference to one or more of FIGS. 2-15.

Each DS unit 36 that receives a slice for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides data object 40 to the user device 14. Note that the first type of user device 12 performs a similar process to retrieve data object 40.

The storage integrity processing unit 20 performs the third primary function of data storage integrity verification. In general, the storage integrity processing unit 20 periodically retrieves slices 48, and/or slice names, of a data object 40 to verify that one or more slices have not been corrupted or lost (e.g., the DS unit failed). The retrieval process mimics the read process previously described.

If the storage integrity processing unit 20 determines that one or more slices 48 is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
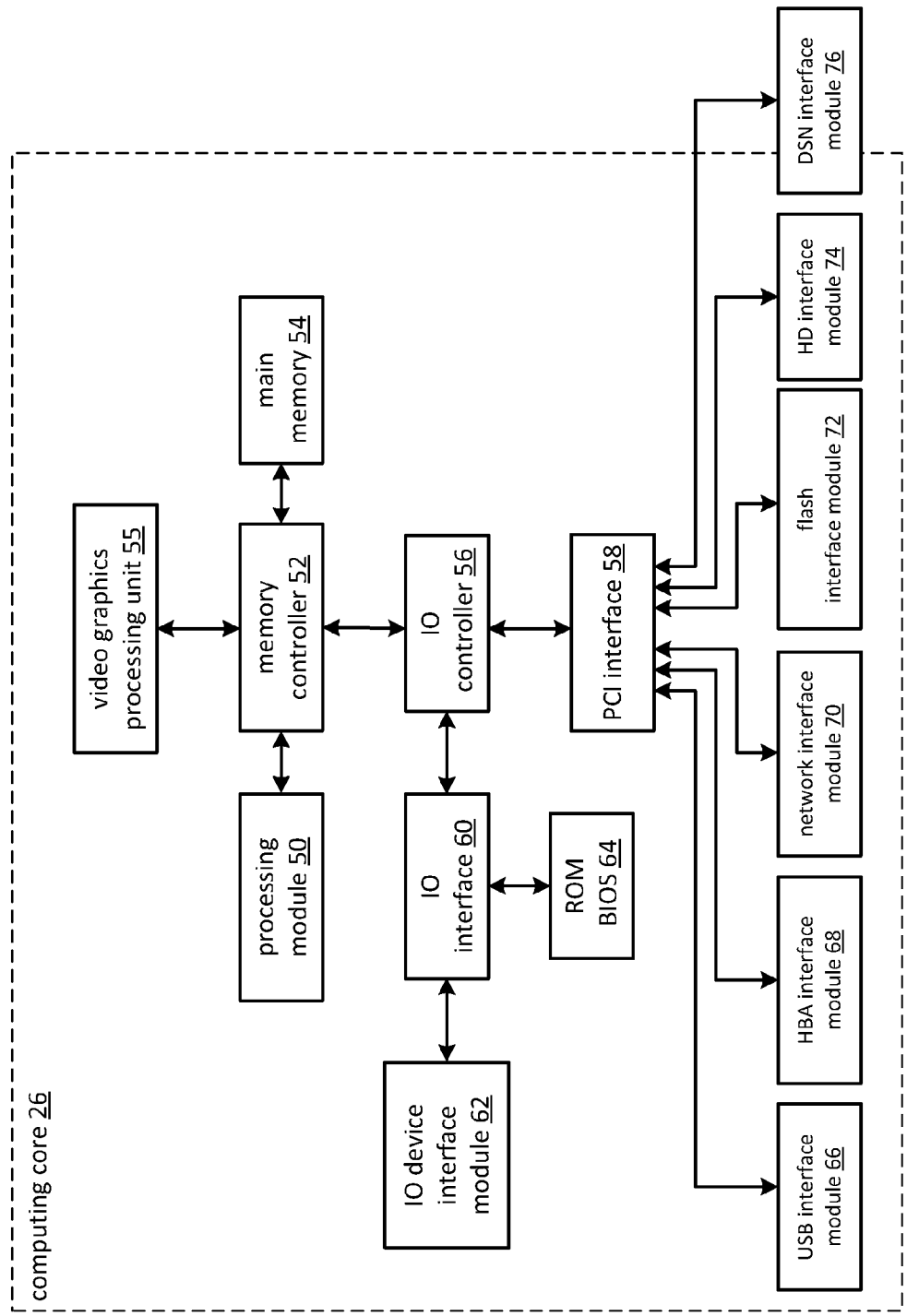
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO interface 60, IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-15.

Figure 3:
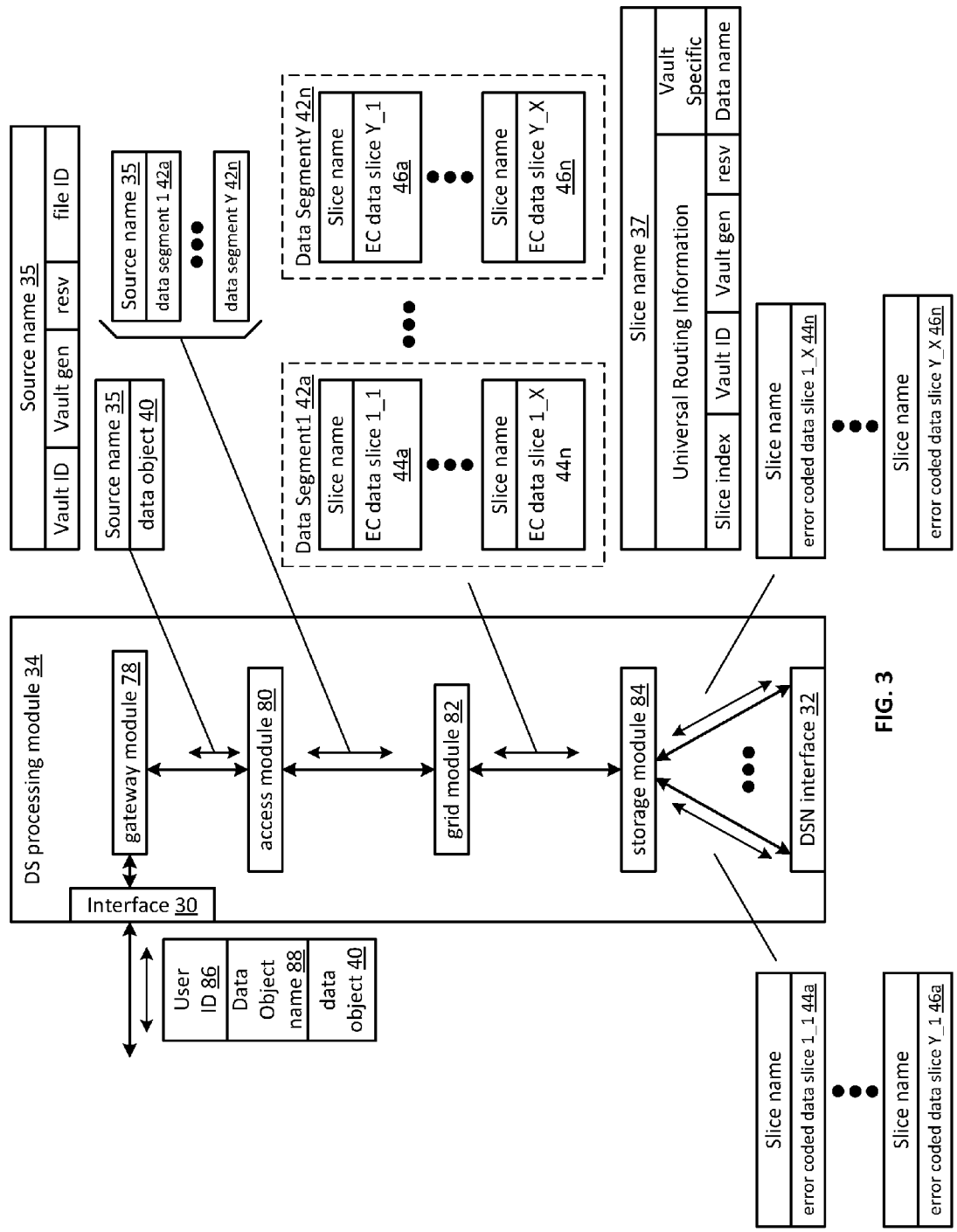
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and DSN interface 32 or the interfaces 30 and/or 32 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming request with a data object 40. The incoming request may also include a user ID field 86, a data object name field 88 and other corresponding information such as a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device 12-14, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data object 40. For instance, the gateway module 78 determines the source name 35 of the data object 40 based on the vault identifier and the data object 40. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a plurality of data segments 1 through Y 42a-n in accordance with a data storage protocol (e.g., file storage system, a block storage system, and/or an aggregated block storage system). The number Y of data segments may be fixed with a segment size depending on the data object size or the number of segments may vary with a fixed segment size. For example, when the number Y of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, when the segment size is fixed, then the number of segments Y varies based on the size of data object. For instance, if the data object is an image file of 4,194,304 bytes and the fixed segment size of each segment is 4,096 bytes, then the number of segments Y=1,024. Note that each segment is associated with the same source name 35.

The grid module 82 receives the Y data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold W is greater than or equal to the read threshold T (i.e., W≥T) for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number n and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded (EC) data slices of a data segment are ready for storage, the grid module 82 determines which of the DS storage units 36 will store the EC data slices based on a dispersed storage memory mapping associated with the user's vault and/or DS storage unit 36 attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 in an embodiment is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module. The storage module then outputs the encoded data slices 1 through X of each segment 1 through Y to the DS storage units. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing 34, which authenticates the request. When the request is authentic, the DS processing 34 sends a read message to each of the DS storage units 36 storing slices of the data object being read. The slices are received via the DSN interface 32 and processed by the storage module 84, which performs a parity check and provides the slices to the grid module 82 when the parity check is successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
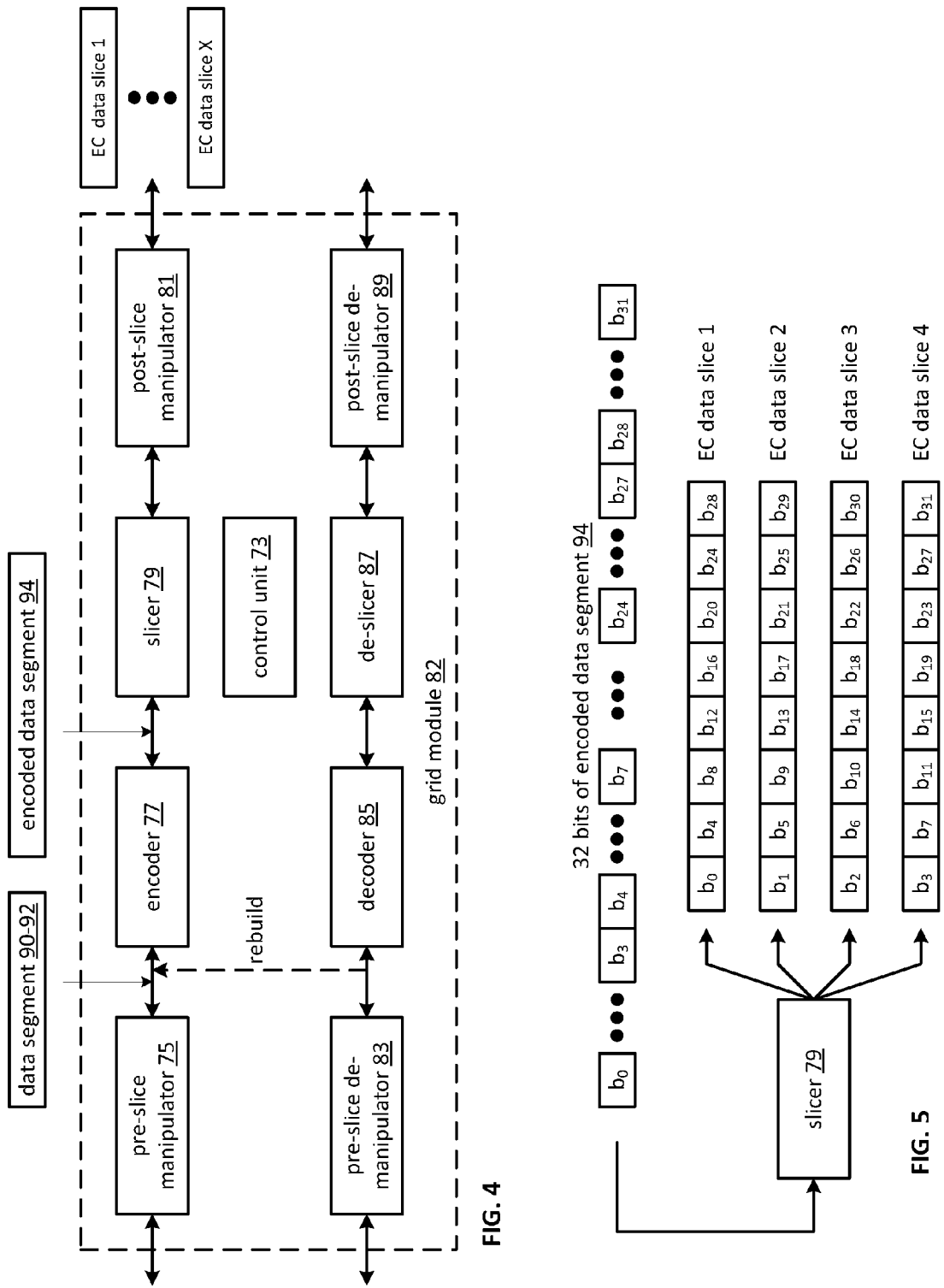
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 42 and a write instruction from an authorized user device. The pre-slice manipulator 75 determines if pre-manipulation of the data segment 42 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 42 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 42 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 42 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 42, the same encoding algorithm for the data segments 42 of a data object, or a combination thereof.

The encoded data segment 94 is of greater size than the data segment 42 by the overhead rate of the encoding algorithm by a factor of X/T, where X is the width or number of slices, and T is the read threshold. In this regard, the corresponding decoding process can accommodate at most X-T missing EC data slices and still recreate the data segment 42. For example, if X=16 and T=10, then the data segment 42 will be recoverable as long as 10 or more EC data slices per data segment are not corrupted.

The slicer 79 transforms the encoded data segment 94 into EC data slices in accordance with the slicing parameter from the vault for this user and/or data segment 42. For example, if the slicing parameter is X=16, then the slicer slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 42. The pre-slice de-manipulator 83 performs the inverse function of the pre-slice manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
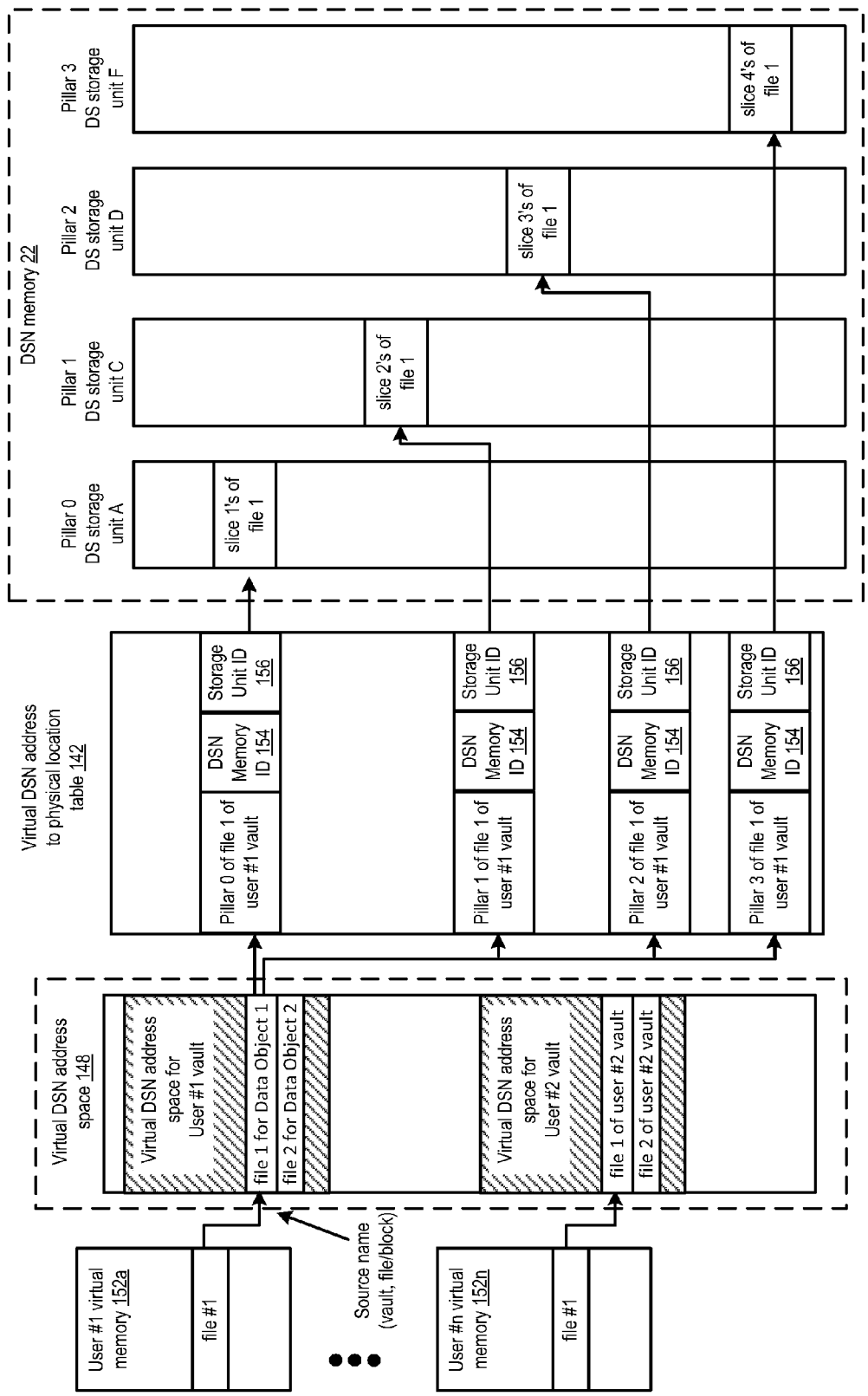
FIG. 6 is a schematic block diagram of an embodiment of a file system hierarchy in accordance with the invention.

FIG. 6 is a schematic block diagram of an embodiment of a file system hierarchy including a plurality of user virtual memories in a virtual DSN address space 148, a virtual dispersed storage network (DSN) address to physical location table 142, and a physical dispersed storage network (DSN) memory 22. The file system hierarchy is an illustration of translating a user virtual memory address space 152 into a virtual dispersed storage network (DSN) address space 148 and then to a physical address in a DSN memory 22. In this illustration, the physical DSN memory 22 includes a plurality of DS storage units 36 (e.g., A, C, D, and F). In an example, where there are four pillars, there are four slices (X=4) created for each of Y data segments. Pillars can be allocated to more than one DS storage unit, but a given DS storage unit is not generally assigned to store more than one pillar from a given file/data object of a user vault to improve system robustness (e.g., avoiding loss of multiple slices of a data segment as a result of a single DS storage unit failure).

In an embodiment, one of the plurality of user virtual memories 152*a-n* utilizes a native OS file system to access the virtual DSN address space 148 by including source name information in requests such as read, write, modify, delete, list, etc. A vault identifier in the source name and/or a file/block name may be used to index the virtual DSN address space 148 to determine a user vault. A unique virtual vault is associated with each user (e.g., an individual, a group of individuals, a business entity, a group of business entities, etc.) and may contain operational parameters, user attributes (e.g., user identification, billing data, etc.) and a list of DSN memories 22 and a plurality of storage units 36 for a DSN memory 22 that may be utilized to support the user.

In an example, the total virtual DSN address space 148 is defined by a forty-eight byte identifier thus creating 256$^{48}$ possible slice names. The virtual DSN address space 148 accommodates addressing of EC data slices corresponding to segments of data objects (e.g., data file, blocks, streams) over various generations and vaults. The slice name is a virtual DSN address and remains the same even as different DS memories 22 or DS storage units 36 are added or deleted from the physical DSN memory 22.

A user has a range of virtual DSN addresses assigned to their vault, user virtual memory 152*a-n*. For instance, the virtual DSN addresses typically do not change over the operational lifespan of the system for the user. In another instance, the virtual DSN address space 148 is dynamically altered from time to time to provide such benefits as improved security and expansion, retraction, and/or capability. A virtual DSN address space 148 security algorithm may alter the virtual DSN address space 148 according to one or more of a command (e.g., from the DS managing unit 18), a schedule, a detected security breach, or any other trigger. The virtual DSN address may also be encrypted in use thus requiring encryption and decryption steps whenever the virtual DSN address is used.

The vault and file name index used to access the virtual DSN address space 148 and to create the slice names (virtual DSN addresses) may also be used as an index to access the virtual DSN address to physical location table 142. For example, the virtual DSN address to physical location table 142 is sorted by vaults and pillars so that subsequent addresses are organized by pillar of the file data segments of a data object that have EC data slices with the same slice identifier and hence are typically stored at the same DS storage unit (e.g., slices having a first pillar identifier are stored in DS storage unit A of DSN memory 22). The output of the access to the virtual DSN address to physical location table 142 is the DSN memory identifier 154 and DS storage unit identifiers 156. A source name, data segment header and/or slice name may include the DSN memory identifier 154 and/or DS storage unit identifiers 156.

The slice names may be used as the virtual index to the memory system of each DS storage unit 36 of a particular DS memory 22 to gain access to the physical location of the EC data slices. In this instance, the DS storage unit 36 of the DS memory 22 maintains a local table correlating slice names (virtual DSN address) to the addresses of the physical media internal to the DS storage unit 36. For example, user number 1 has a vault identified operational parameter of four pillars and pillar 0 is mapped to DS storage unit A of DSN memory 22, pillar 1 is mapped to DS storage unit C of DSN memory 22, pillar 2 is mapped to DS storage unit D of DSN memory 22, and pillar 3 is mapped to DS storage unit F of DSN memory 22.

Figure 7:
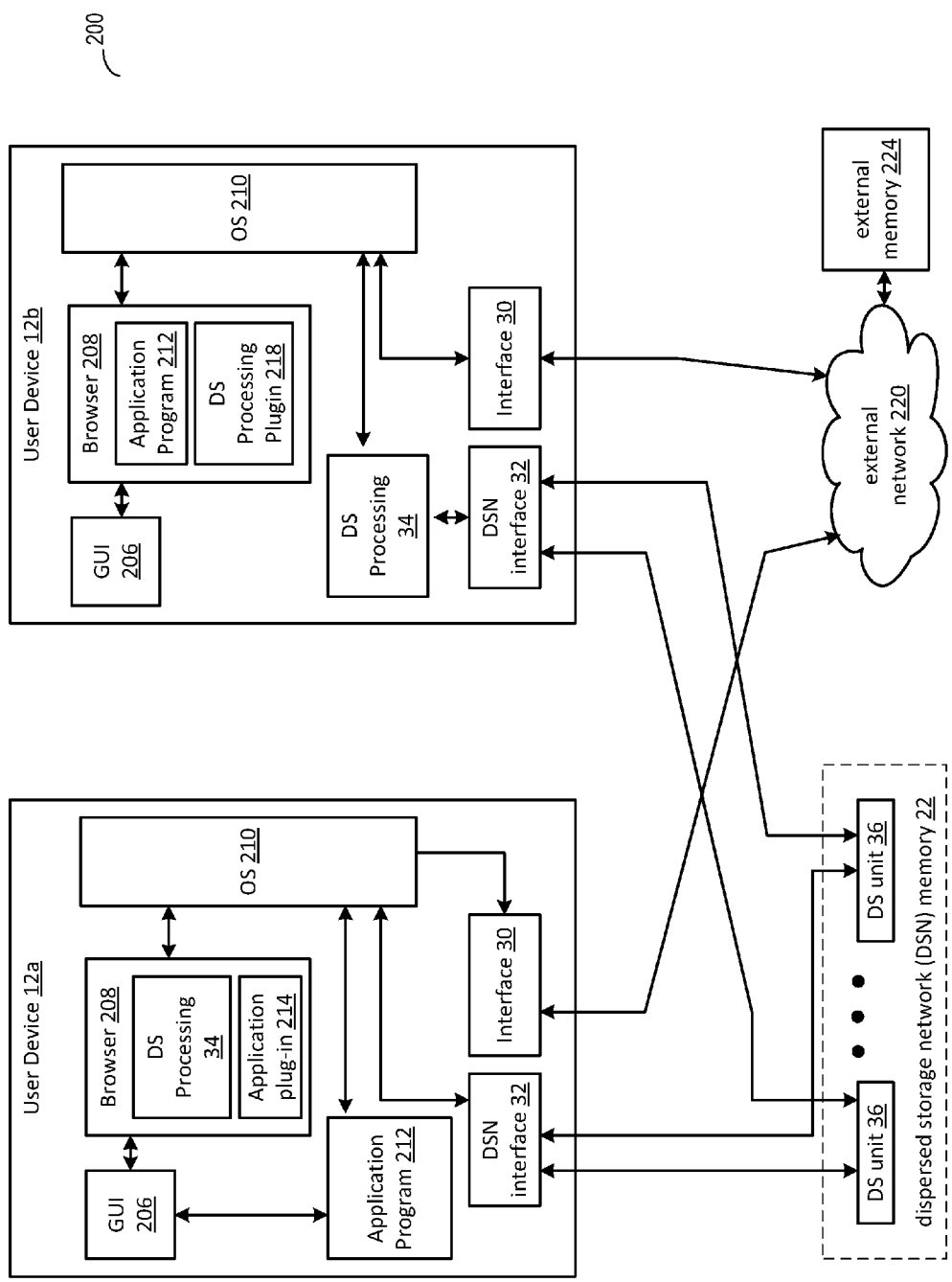
FIG. 7 is a schematic block diagram of an embodiment of a computer system operable to retrieve a data object from a DSN memory in accordance with the invention.

FIG. 7 is a schematic block diagram of an embodiment of a computer system 200 operable to access a data object from a DSN memory 22. The system includes one or more user devices 12*a-b*, a local DSN memory 22, an external network 220 and an external memory 224. In an embodiment, the user device 12*a* and the user device 12*b* are operably coupled to the DSN memory 22 through a local connection or local area network or through an external network such as external network 220. The user devices 12*a-b* are operably coupled to the external memory 224 through the external network 220. The external memory 224 may include, for example, a file server, web server, another DSN memory 22, etc. The external network 220 may include a metropolitan area network (MAN) and/or a wide area network (e.g., the internet and/or intranet).

User device 12*a-b* includes a graphical user interface (GUI) 206, a browser 208, an operating system (OS) 210 and application program 212. The OS 210 provides an operating environment for the user device 12 and acts as an intermediary between modules (including hardware and/or software applications) of the user device 12. The GUI 206 provides the interface to a user device display. The application program 212 includes software, and hardware (such as processing modules) necessary to operate the software, that perform functions or tasks for a user of the user device or for another application program or device. Examples of application programs include text or word processing programs, image processing programs, database programs, development tools, drawing programs, communication programs, etc. In an embodiment, the application program 212 includes a video and/or audio multimedia player, such as Windows Media Player, Apple Quicktime, Real Player, Apple iTunes, Adobe Flash Player, etc.

The browser 208 is operable to retrieve and display an information resource, such as a text file (.doc, .pdf, etc.), HTML file, XML file, image file (such as .jpg, .pdf, .tiff, etc.), video file (such as .swf, .mov, .mpg4, .aiff, etc.), audio file (such as, .wma, .wav, .mp3, etc), or other types of files. The browser 208 includes an application plugin 214 that is operable to interact with the application program 212. Through the application plugin 214, the browser 208 is operable to launch the application program 212 to either open a file in a GUI external to the web browser or within a web page, window or other GUI generated by the browser 208.

In an embodiment illustrated in user device 12*a*, the browser 208 includes DS processing module 34. The browser 208 is operable to recognize an address for the DSN memory 22 or file name of a data object stored in DS memory 22 and launch DS processing module 34 to retrieve the data object for display within a web page, window or other GUI generated by the browser 208. In another embodiment, the browser 208 launches the application program 212 to either display the data object external to the web browser or within a web page, window or other GUI generated by the browser 208.

In an embodiment illustrated in User Device 12*b*, the browser 208 includes a DS processing plugin 218 that is operable to interact with DS processing 34. The browser 208 is operable to recognize an address for the DSN memory 22 or file name of a data object stored in DS memory 22 and through the DS processing plugin 218, the browser 208 is operable to launch DS processing module 34 to access the data object and to either open the data object in a GUI external to the web browser or within a web page, window or other GUI generated by the browser 208.

FIG. 8 is a logic flow diagram of an embodiment of a method 240 for accessing a data object stored in a DSN memory 22 by a browser 208 in user device 12*a-b*. In step 242, the browser 208 receives a file command that includes a file name of a data object. In an embodiment, the file name of the data object includes a domain name, a data object name and file type identifier. For example, the file name of the data object may include the following: localdsnet.com/dataobjectname.wmv, wherein localdsnet.com is the domain name referring to a local DSN memory 22. In another example, the file name of the data object includes the following: externaldsnet.com/vault1/dataobjectname.doc, wherein externaldsnet.com is a domain name that points to an external DS memory 22 accessed by the external network 220 and vaultl/dataobjectname.doc is the data object name including a vault identifier of the virtual DSN address. In another example, the file name of the data object includes the following: webservers.com/partitionl.mpg4, wherein the domain name webservers.com refers to webservers in external memory 224. The file names in the above examples also include a file type identifier, such as .pdf for an Adobe text file and .wmv for a Windows Media video file. In another embodiment, the file name may include an IP address for the destination, rather than a domain name. For example, an IP address may point to a DSN memory 22 in the file name. In another embodiment, the file name may include a local drive to the user device 12.

Based on the file command for the data object, and in particular for example, the domain name or IP address or local drive in the file name, the browser 208 determines a location for the data object in step 244. The file name may be used to perform a table lookup, an address translation, domain name service lookup, vault and file name index, or a link/web directory lookup to determine the location of the data object. When the browser determines that the data object is located in a local or external DSN memory 22, it launches DS processing 34. The DS processing 34 determines a virtual DSN address of the data object for the browser 208 in step 246. In an embodiment, the file name includes the data object name 88 shown in FIG. 3, and the virtual DSN address is determined from the data object name 88 by accessing the virtual DSN address space 148 for a user vault 200. In an embodiment, the file name includes a vault identifier or other part of a virtual DSN address of the data object. For example, the file name of the data object may include a vault identifier or file ID or source name or user identifier associated with the data object, such as in the following: localdsnet.com/vaultl/fileID/dataobjectname.mov or in the following: externaldsnet.com/D SNvirtualaddress/dataobj ectname.pdf.

File data from the data object is retrieved from the DSN memory in step 248 and processed for display either in a GUI external to the browser 208 or within a web page, window or other GUI generated by the browser 208. In an embodiment, the whole data object is reconstructed prior to display. In another embodiment, file data from the data object is streamed to the application program 212 and displayed as processed. In an embodiment, the browser 208 requests DS processing module 34 to retrieve the data object for processing by the application program 212.

FIG. 9 is a schematic block diagram of an embodiment of a file name 260. In an embodiment, the file name 260 includes one or more of a localdrive/domain name/IP address 262, a vault ID 264, a DSN virtual address 266 (in whole or in part), a data object name 268 and a file type identifier 270. The file name 260 may include other parameters or alternate data as well.

Figure 10:
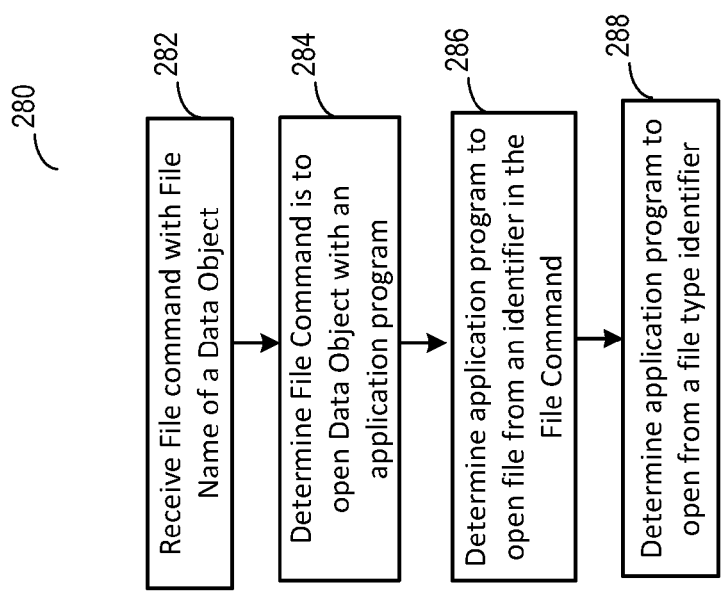
FIG. 10 is a logic flow diagram of a method for interpreting a file command to open a data object stored in a DSN memory in accordance with the invention.

FIG. 10 is a logic flow diagram of a method for interpreting a file command by the browser 208 in user device 12*a-b* to display a data object stored in a DSN memory. In step 282, the browser 208 receives a file command with a file name 260 of a data object in response to a user input. In an embodiment, the browser 208 displays an HTML or other type of formatted page that includes a link to an embedded file command and the user input is selecting the embedded link. For example, the file command includes the file name for the data object and may also include an identifier of an application program 212 to display the data object and other parameters for retrieving and/or displaying the data object. For example, the file command may include:

```
<OBJECT ID="MediaPlayer" WIDTH="192" HEIGHT="190"
<PARAM name="FileName" VALUE=
"localdsnet.com/dataobjectname.wmv">
<PARAM name="ShowControls" VALUE="true">
<PARAM name="ShowStatusBar" value="false">
</OBJECT>
```

The above file command example includes an object identifier that identifies Windows Media Player as the multimedia player. It also includes the file name of the data object as localdsnet.com/dataobjectname.wmv. In addition, it specifies a window width and height to display the data object. The file command also includes a parameter to show video controls and not show a status bar.

In another example, the file command embedded in a web page may include:

```
<ahref="externalsnet.com/virtualDSNaddress/dataobjectname.pdf">
Download PDF</a>
```

In this example, the file command includes the virtual DSN address as part of the file name.

It also includes a file type identifier as a PDF file.

In another embodiment, the file command may include a local drive to the user device 12.

For example the file command may include:
  <open E/vault1/dataobjectname.doc>

In this example, the local drive designated as E/is mapped to the DSN memory 22.

In another embodiment, the browser 208 receives a text string input with a file name 260 of a data object. For example, the browser may receive a user input of the following file name 260 in the form of text string input in a user prompt of the GUI: "http://localsnet.com/vault1/dataobj ectname.mp3".

The browser 208 then interprets the file command as a request to display or open the data object using application program 212 in step 284. The browser 208 determines the application program 212 from an identifier in the file command in step 286. For example, the application program 212 may be identified in the file command. In another embodiment, the browser 208 determines application program 212 from the file type identifier in step 288. For example, when the file name includes a file type identifier 270 (such as .wav, .mov, .mp3, etc.) or the file command includes a parameter with a file type identifier (such as type="application/x-shockwave-flash"), the browser 208 selects a multimedia player operable to process and display such identified file types.

Figure 11:
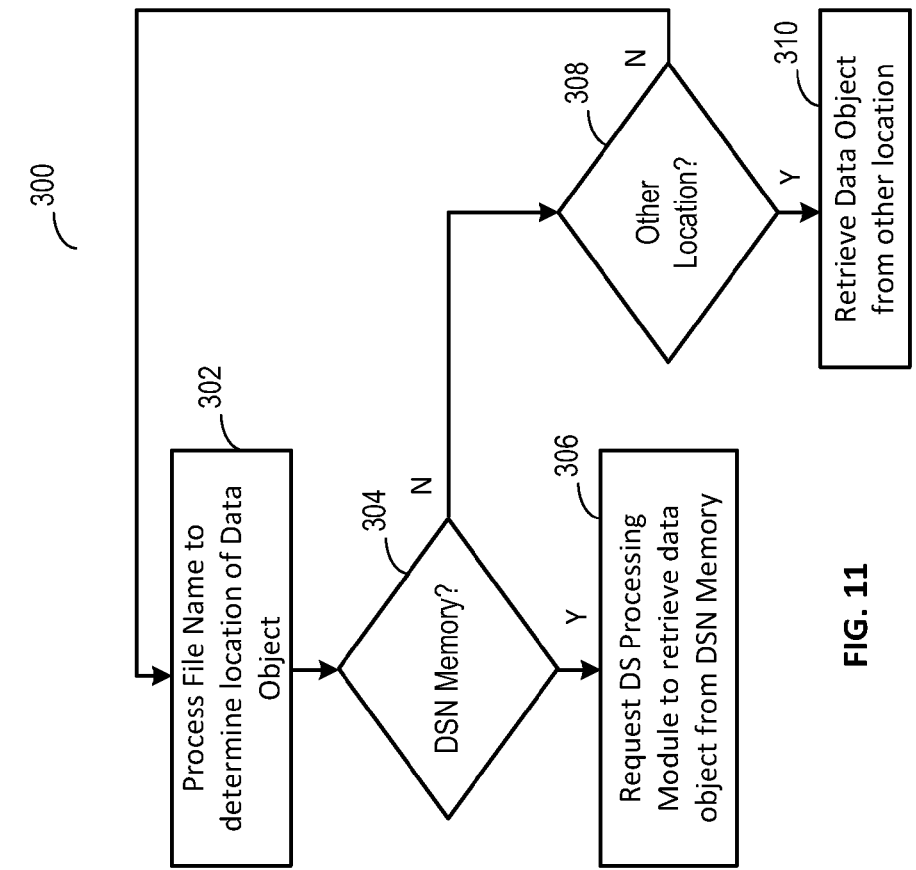
FIG. 11 is a logic flow diagram of an embodiment of a method for determining a location of a data object in response to a file command in accordance with the invention.

FIG. 11 is a logic flow diagram of an embodiment of a method 300 for determining a location of a data object in response to a file command. In step 302, the browser 208 processes the file command to determine a location of the data object. For example, the file name may include a local drive or domain name or an IP address of the location of the data object. The domain name and/or IP address may be used to perform a table lookup, an address translation, domain name service lookup or a link/web directory lookup to determine the location of the data object. In an embodiment, the browser 208 determines the location of the data object as the DSN memory. In another embodiment, the application program 212 determines the location of the data object as the DSN memory. In step 304, when the file name points to a DSN memory 22, either local or external, the browser 208 requests DS processing module 34 to retrieve the data object from the DSN memory 22 as an input for application program 212. In another embodiment, application program 212 requests the DS processing module 34 to retrieve the data object from the DSN memory 22.

When the file name points to another type of location, other than a DSN memory 22, either local or external, in step 308, the data object is retrieved from the other location in step 310. The other location includes, for example, a file server, web server, another type of memory, etc. When the location cannot be identified in step 308, the process returns to step 302 to further process the file name or request further information.

Figure 12:
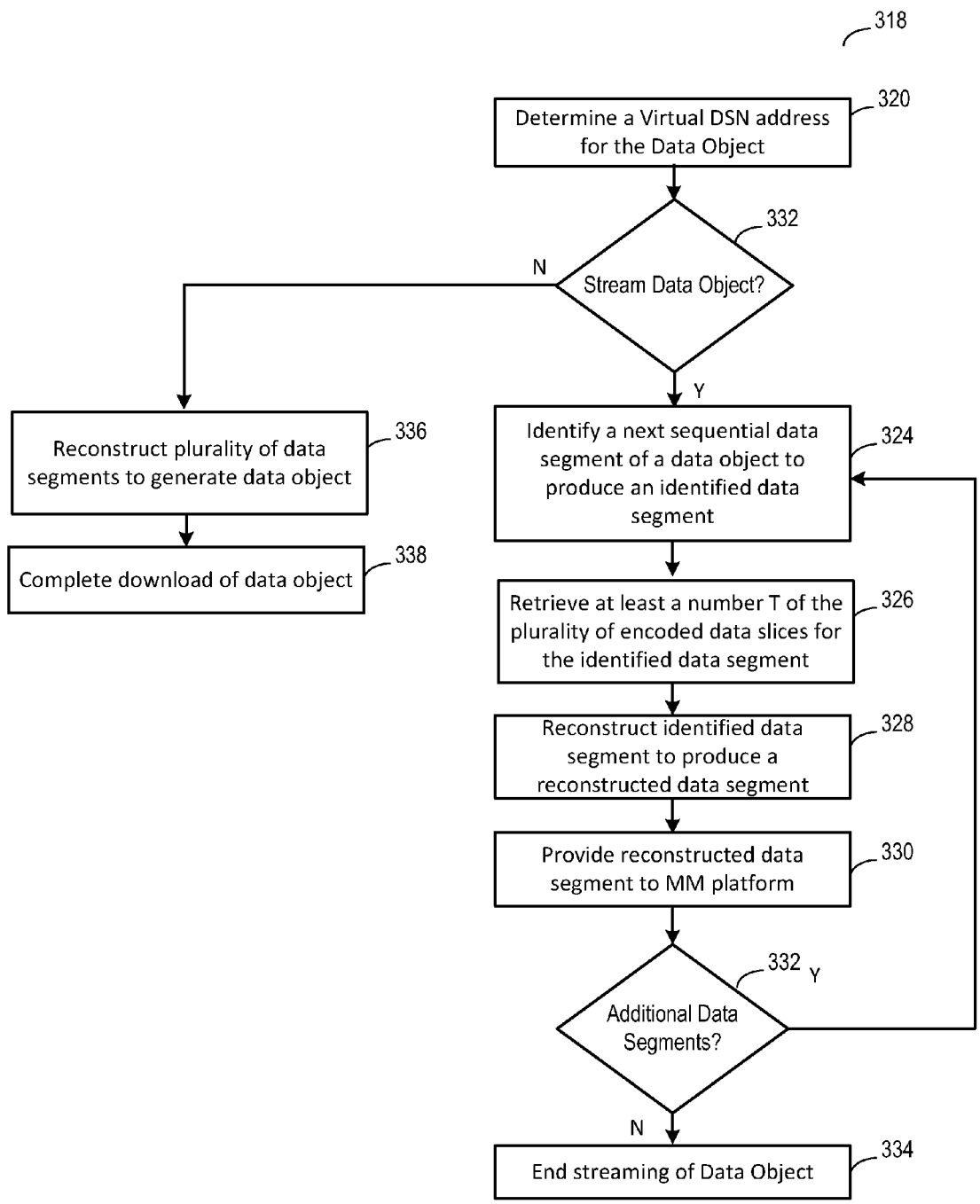
FIG. 12 is a logic flow diagram of an embodiment of a method for retrieving a data object from the DSN memory in accordance with the invention.

FIG. 12 is a logic flow diagram of an embodiment of a method 318 for retrieving the data object from the DSN memory. In step 320, a virtual DSN address for the data object is determined. In an embodiment, the file name includes one or more fields of the virtual DSN address of the data object.

For example, the file name of the data object includes the following: localdsnet.com/DSNvirtualaddress/dataobjectname.mov. The virtual DSN address of the data object may be the source name 35 shown in FIG. 3 or other identifier that identifies the virtual DSN address space 148 in the user vault assigned to the data object or its corresponding data segments or data slices.

In another embodiment, the file name includes the data object name 88 shown in FIG. 3 and the virtual DSN address is determined from the data object name 88 and/or a user ID 86 associated with user device 12*a-b*. The virtual DSN address for the data object is then determined from a look up of the virtual DSN address space 148 for a user vault shown in FIG. 6. From the virtual DSN address of the data object, the DS processing module 34 then determines a physical address for a plurality of data slices of data segments for the data object based on the virtual DSN address to physical location table 142.

In step 322, the DS processing module 34 determines whether to stream the data object. In an embodiment, the data object includes multimedia content, such as audio and/or video file data. The DS processing module 34 may stream file data of the data object to the application program 212 as sequential data segments. For example, the data object is stored by partitioning the data object into data segments 1 through Y, and then generating a number X of encoded data slices from each data segment based on an error encoding dispersal function. To stream file data from the data object, the DS processing module 34 reconstructs each of the data segments in sequential order 1 through Y.

When the DS processing module determines to stream the data object, the DS processing module 34 determines a next sequential data segment of the data object to produce an identified data segment in step 324. The DS processing module 34 retrieves at least a number T of the plurality of encoded data slices needed to reconstruct the identified data segment in step 326. In step 328, the DS processing module 34 reconstructs the identified data segment to produce a reconstructed data segment. The DS processing module 34 provides the reconstructed data segment to the application program 212, such as a multimedia player or other multimedia platform, for processing (such as rendering of the file data) for display. In an embodiment, the application program 212 provides the rendered file data to the GUI 206 for final conversion to a format compatible with the user device display. In step 332, the DS processing module 34 determines whether additional data segments need to be reconstructed, e.g. whether a number Y of data segments have been reconstructed. If so, the DS processing module 34 ends streaming of the data object in step 334. If not, the process continues to step 324 to identify the next sequential data segment.

When the DS processing module 34 determines to download the data object without streaming in step 332, the DS processing module 34 reconstructs the plurality of data segments of the data object in step 336 and then provides the location of downloaded data object to the application program 212 when the download is complete in step 338.

Figure 13:
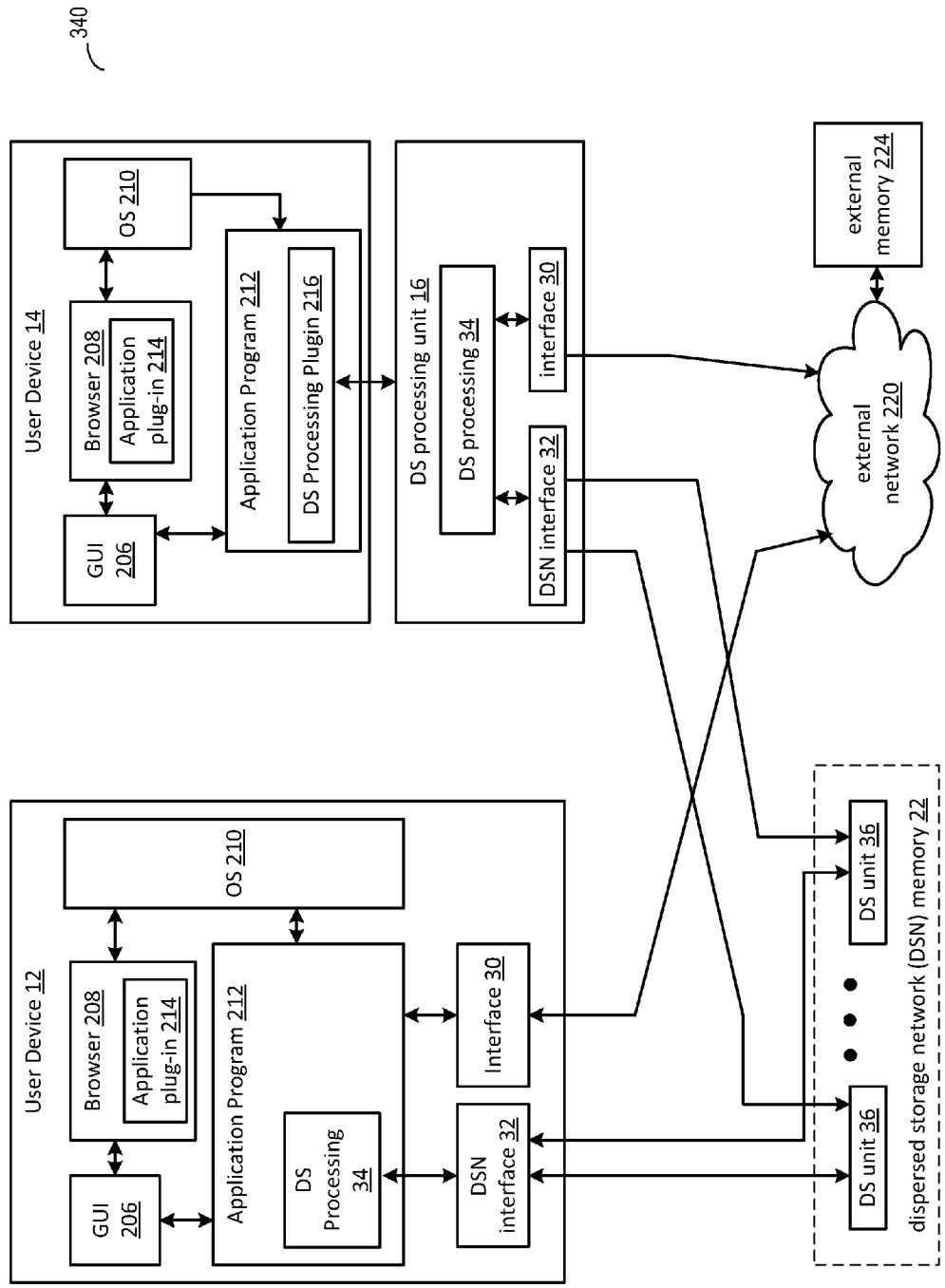
FIG. 13 is a schematic block diagram of another embodiment of a computer system to retrieve a data object from a DSN memory in accordance with the invention.

FIG. 13 is a schematic block diagram of another embodiment of a computer system 200 operable to access a data object from DSN memory 22. The computer system 200 includes one or more user devices 12, 14, a DS processing unit 16, a local DSN memory 22, an external network 220 and an external memory 224. In an embodiment, the user device 12 and the user device 14 are operably coupled to the DSN memory 22 through a local connection or local area network or through an external network such as external network 220. The user devices 12, 14 are operably coupled to the external memory 224 through the external network 220.

Application program 212 in user device 212 includes DS processing 34 that is operable to access data objects in DSN memory 22. The DS processing 34 enables the application program 212 to recognize virtual DSN addresses of data objects stored in DSN memory 22 and store, retrieve and access such data objects from DSN memory 22. In user device 12, application program 212 includes a DS processing plugin 216 that is operable to launch DS processing 34 in DS processing unit 16. The DS processing plugin 216 enables application program 212 to recognize virtual DSN addresses of data objects stored in DSN memory 22 and store, retrieve and access such data objects from DSN memory 22.

Figure 14:
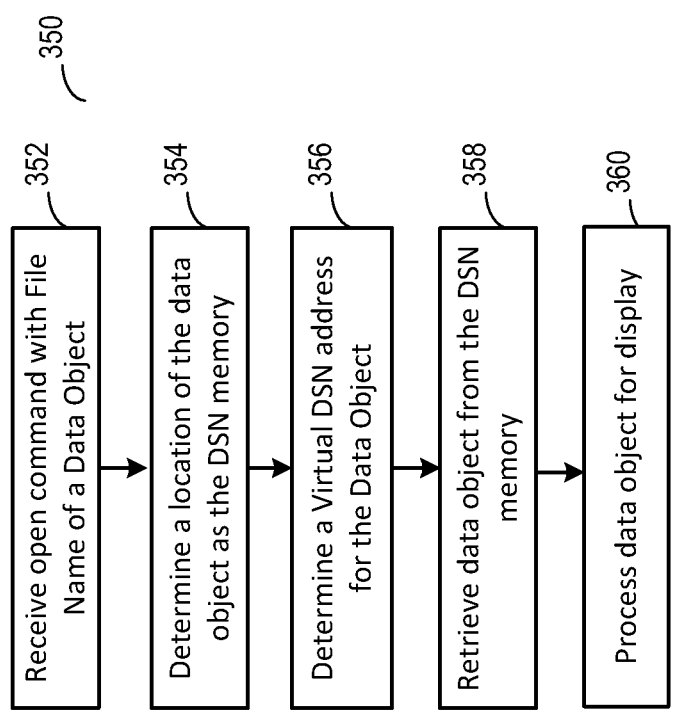
FIG. 14 is a logic flow diagram of another embodiment of a method for retrieving a data object from a DSN memory in accordance with the invention.

FIG. 14 is a logic flow diagram of an embodiment of a method 350 for accessing a data object stored in a DSN memory 22 by an application program 212 in user device 12, 14. In step 352, the application program receives a file command that includes a file name of a data object. Based on the file command for the data object, and in particular for example, a drive or IP address or domain name, the application program 212 determines a location for the data object in step 354. For example, the IP address or domain name may be used to perform a table lookup, an address translation, domain name service lookup or a link/web directory lookup to determine the location of the data object. A local drive may be mapped to a local DSN memory 22. When the application program 212 determines that the data object is located in a local or external DSN memory 22, it launches DS processing 34. The DS processing 34 determines a virtual DSN address of the data object for the application program 212 in step 356. File data from the data object is retrieved from the DSN memory in step 358. The application program 212 then processes the data object for display. In an embodiment, the data object is downloaded prior to display. In another embodiment, file data from the data object is streamed to the application program 212 and displayed as processed.

Figure 15:
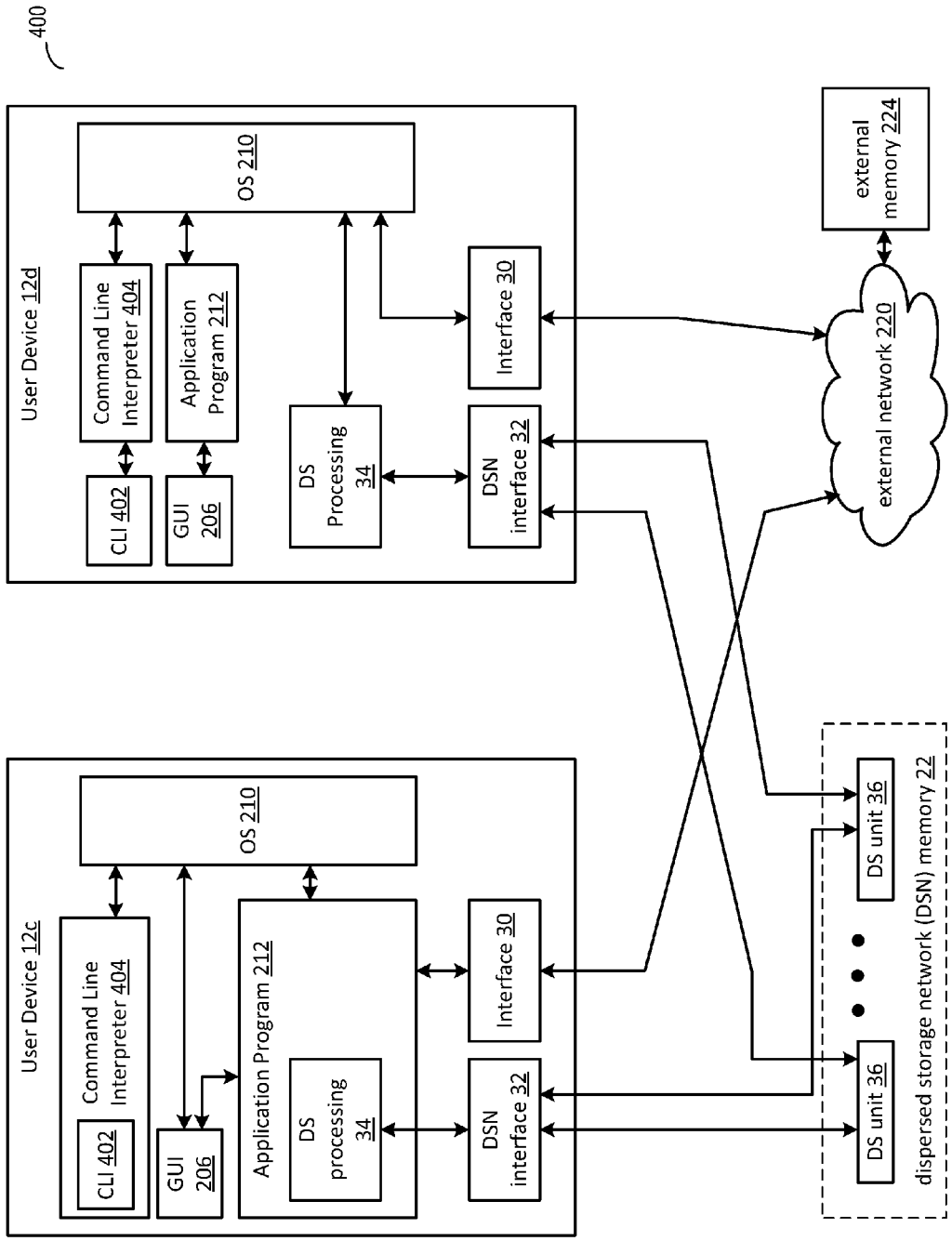
FIG. 15 is a schematic block diagram of another embodiment of a computer system to retrieve a data object from a DSN memory in accordance with the invention.

FIG. 15 is a schematic block diagram of another embodiment of a computer system 400 operable to access a data object from DSN memory 22. The computer system 400 includes one or more user devices 12*c-d*, a local DSN memory 22, an external network 220 and an external memory 224. In an embodiment, the user devices 12*c-d* are operably coupled to the DSN memory 22 through a local connection or local area network or through an external network such as external network 220. The user devices 12*c-d* are operably coupled to the external memory 224 through the external network 220. The external memory 224 may include, for example, a file server, web server, another DSN memory 22, etc. The external network may include a metropolitan area network (MAN) and/or a wide area network (e.g., the internet and/or intranet).

User Device 12*c* includes a graphical user interface (GUI) 206, a command line interface (CLI) 402, a command line interpreter 404, an operating system (OS) 210 and application program 212. The CLI 402 is a text interface for receiving file commands to perform various tasks. The CLI interpreter 404 receives the file commands entered at the CLI 402 and interprets and executes the file commands. For example, the command line interpreter 404 may include a Unix shell program (such sh, Bash, ksh, csh, etc.), DOS COMMAND.COM, Microsoft Windows PowerShell, Macintosh Terminal, etc. The application program 212 includes a video and/or audio media player, such as Windows Media Player, Apple Quicktime, Real Player, Apple iTunes, Adobe Flash Player, etc. In an embodiment illustrated in user device 12*c*, the application program 212 includes a DS processing module 34 that is operable to interface with DSN memory 22 through DSN interface 32. The application program 212 may also access external memory 224 through interface 30. In an embodiment, in response to one or more file commands input at the CLI 402, the CLI interpreter 404 is operable to launch the application program 212 to retrieve and display a data object stored in DSN memory 22.

Figures 16, 17:
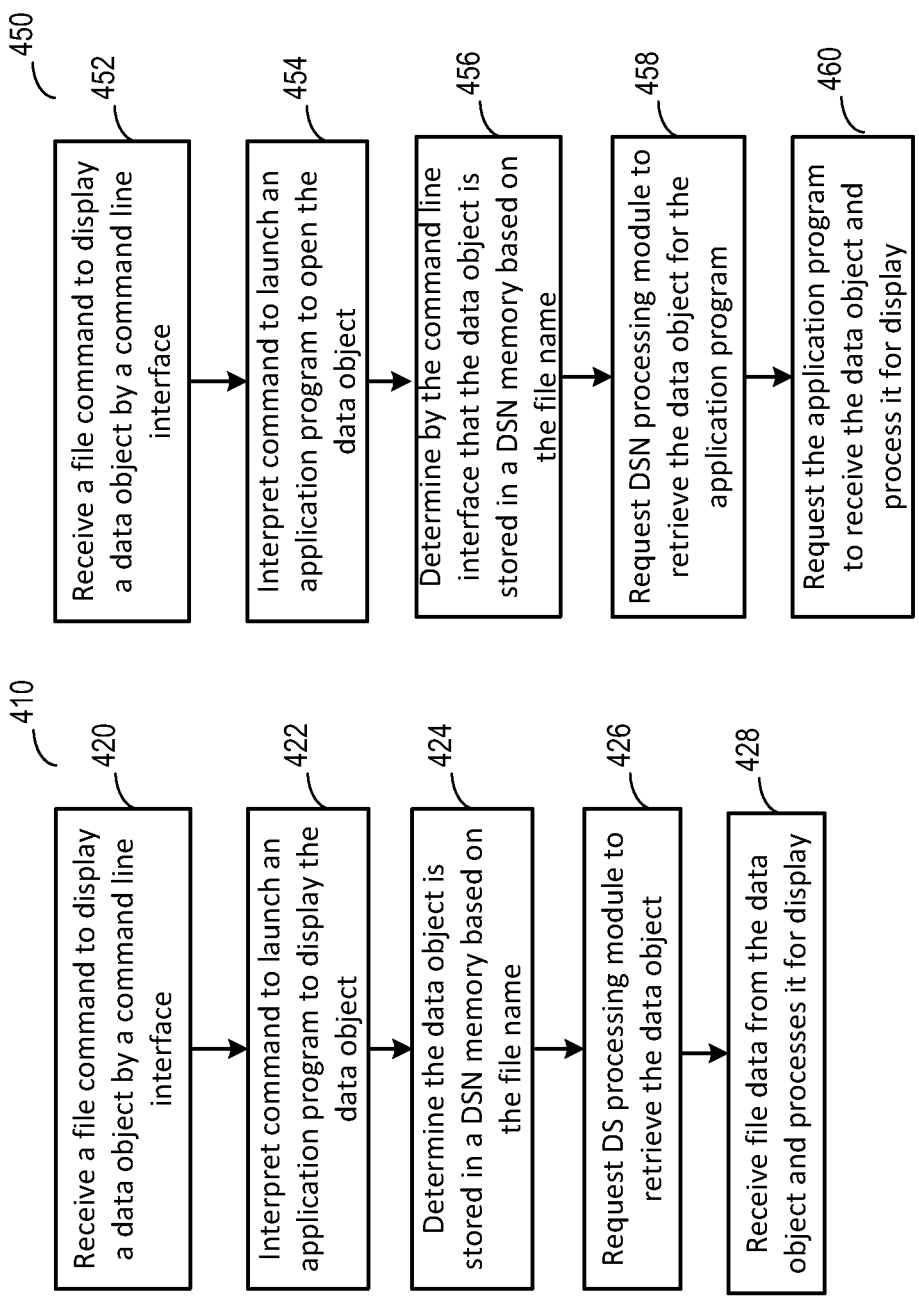
FIG. 16 is a logic flow diagram of another embodiment of a method for retrieving a data object from a DSN memory in accordance with the invention.
FIG. 17 is a logic flow diagram of another embodiment of a method for retrieving a data object from a DSN memory in accordance with the invention.

FIG. 16 is a logic flow diagram of an embodiment of a method 410 for retrieving a data object from a DSN memory 22. In step 420, the command line interpreter 404 receives a command line input at the CLI 302. The command line interpreter 404 analyzes the one or more file commands in the input and interprets the file command to launch an application program 212 to open the data object in step 422. In this embodiment, the application program 212 receives the file name of the data object and determines the data object is located in a DSN memory in step 424. As described herein, the application program 212 determines the location of the data object based on the file command. For example, the file name of the data object includes a local drive or domain name or an IP address that points to the location of the data object. For example, when "localdsnet.com" is a domain name for a local DSN memory 22, the application program 212 interprets the file name "localdsnet.com/dataobjectname.mov" to indicate that the data object is located in the local DSN memory 22. In another example, when "externaldsnet.com" is a domain name for an external DSN memory 22 accessed by the external network 220, the application program 212 determines that a data object with a file name "externaldsnet.com/dataobjectname.mp3" is located in the external DS memory 22.

The application program 212 then requests the DS processing module 34 to retrieve the data object in step 426. The DS processing module 34 may stream sequential data segments of the data object to the application program 212 for display or reconstruct the data object prior to display. The application program 212 receives the file data from the data object and processes the file data for display.

Referring back to FIG. 15, the command line interpreter 404 and DS processing 34 are operably coupled for example by the operating system 210. In operation, the command line interpreter 404, in response to one or more file commands input at CLI 302, recognizes a domain name or IP address for DSN memory 22 in the file command and launches DS processing module 34 to retrieve a data object in DSN memory 22 and input the data object to application program 212. The command line interpreter 404 also launches application program 212 to receive file data from DS processing module 34 to open it for display.

FIG. 17 is a logic flow diagram of an embodiment of a method 450 for retrieving a data object from a DSN memory for display. In step 452, the command line interpreter 404 receives a command line input at the CLI 302. The command line interpreter 404 analyzes the one or more file commands in the input and interprets the file command to launch application program 212 to open the data object in step 454.

In this embodiment, the command line interpreter 404 determines the data object is located in the DSN memory in step 456. The command line interpreter 404 determines the location of the data object based on a local drive, domain name or IP address in the file command. The command line interpreter 404 then requests the DS processing module 34 to retrieve the data object for the application program 212 in step 458. The DS processing module 34 may stream sequential data segments of the data object to the application program 212 for display or reconstruct the whole data object prior to display. In step 460, the command line interface requests the application program 212 to receive the data object from the DS processing module 34 and process it for display.

As may be used herein, the term(s) "coupled to" and/or "coupling" and/or includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for displaying a data object, comprises:
   interpreting a file command to display the data object by a command line interpreter operating on a user device, wherein the file command includes a file name of the data object;
   determining the data object is stored in a distributed storage network (DSN) memory based on the file name, wherein the data object is stored as a plurality of data segments, wherein a data segment of the plurality of data segments is stored as an X number of encoded data slices and wherein a threshold number T corresponds to a threshold value of the X number of encoded data slices needed to reconstruct the data segment using an error encoding dispersal storage function and wherein X>T;
   requesting a DSN processing module to retrieve the data object from the DSN memory by:
      translating the file name into a virtual DSN address to determine a location in the DSN memory of the data object, wherein the file name includes a vault identifier of a virtual DSN address space assigned to the user device; and
retrieving the data object from the DSN memory.

2. The method of claim 1, wherein the file name for the data object includes a domain name for the DSN memory, a data object name and a file type identifier.

3. The method of claim 1, wherein retrieving the data object from the DSN memory includes:
retrieving at least the threshold number T of the X number of encoded data slices from the DSN memory; and
reconstructing the data object from at least the threshold number T of encoded data slices.

4. The method of claim 3, further comprising:
determining a plurality of virtual slice addresses for at least the threshold number T encoded data slices using the virtual DSN address, wherein a virtual slice address includes:
a slice index based on the vault identifier and a pillar identifier that identifies a pillar associated with a data slice; and
a source data name containing an identifier of the data object.

5. The method of claim 1, further comprising:
retrieving the data object by the DSN processing module by streaming sequential data segments of the plurality of data segments of the data object.

6. The method of claim 5, wherein retrieving the data object by the DSN processing module by streaming sequential data segments of the plurality of data segments of the data object includes:
translating the file name into a virtual DSN address to determine a location of the data object in the DSN memory;
identifying a next sequential data segment of the plurality of data segments to generate an identified data segment;
retrieving at least the threshold number T of encoded data slices for the identified data segment from the DSN memory;
reconstructing the identified data segment from at least the threshold number T of the encoded data slices to produce a reconstructed data segment; and
providing the reconstructed data segment for display on the user device.

7. The method of claim 6, further comprising:
determining an application program to process the data object based on the file command including:
determining a file type of the data object based on a file type identifier, wherein the file type is a multimedia file; and
identifying a multimedia player to display the data object based on the file type; and
requesting the multimedia player to input the data object and process the data object for display.

8. The method of claim 7, further comprising:
processing the reconstructed data segment by the multimedia player to generate multimedia content; and
transmitting the multimedia content by the multimedia player to a graphical user interface for display on the user device.

9. A user device for retrieving a data object, comprises:
a distributed storage network (DSN) interface that is operably coupled to interface with a DSN memory, wherein the data object is stored in the DSN memory;
a command line interpreter operating in the user device operable to:

interpret a file command to retrieve the data object, wherein the file command includes a file name of the data object and wherein the file name includes a vault identifier of a virtual DSN address space assigned to the user device; and
determine the data object is stored in the DSN memory based on the file name, wherein the data object is stored as a plurality of data segments, wherein a data segment of the plurality of data segments is stored as an X number of encoded data slices and wherein a threshold number T corresponds to a threshold value of the X number of encoded data slices needed to reconstruct the data segment using an error encoding dispersal storage function and wherein X>T; and
a processing module operable to:
receive a request from the command line interpreter to retrieve the data object from the DSN memory;
translate the file name of the data object into a virtual DSN address to determine a location in the DSN memory of the data object using the vault identifier of the virtual DSN address space assigned to the user device;
retrieve the data object from the determined location in the DSN memory by retrieving, for each data segment of the plurality of data segments, at least the threshold number T of encoded data slices; and
reconstructing the plurality of data segments of the data object from the pluralities of the at least the threshold number T of encoded data slices.

10. The user device of claim 9, wherein the file name for the data object includes a local drive of the user device that is mapped to the DSN memory and wherein the command line interpreter is further operable to determine that the data object is stored in the DSN memory based on the local drive.

11. The user device of claim 9, wherein the command line interpreter is further operable to:
determine a file type of the data object based on a file type identifier, wherein the file type is a multimedia file; and
identify a multimedia player to display the data object based on the file type.

12. The user device of claim 11, wherein the processing module is operable to:
retrieve the data object from the DSN memory by streaming sequential data segments of the plurality of data segments of the data object.

13. The user device of claim 12, wherein the processing module is operable to:
identify a next sequential data segment of the plurality of data segments to generate an identified data segment;
retrieve the at least the threshold number T of encoded data slices for the identified data segment from the DSN memory;
reconstruct the identified data segment from the at least the threshold number T of encoded data slices to produce a reconstructed data segment; and
providing the reconstructed data segment to the multimedia player.

14. The user device of claim 13, wherein the multimedia player is operable to:
process the reconstructed data segment to generate multimedia content; and
transmit the multimedia content to a graphical user interface for display.

15. The user device of claim 9, wherein the processing module is further operable to store the data object in the DSN memory by:

assigning an address to the data object from the virtual DSN address space associated with the user device;

partitioning the data object into the plurality of data segments;

generating, for the plurality of data segments, a plurality of the X number of encoded data slices based on an error encoding dispersal function;

assigning a plurality of X number of slice names to each of the plurality of the X number of encoded data slices, wherein the slice name includes the vault identifier that identifies the virtual DSN address space associated with the user device; and storing the data object in the DSN memory as the plurality of the X number of encoded data slices in accordance with the plurality of X number of slice names.

16. A user device comprises:

a distributed storage network (DSN) interface that is operably coupled to interface with a DSN memory;

a command line interpreter operable to interpret a file command to store a data object in the DSN memory; and a processing module coupled to the DSN interface operable for storing the data object in the DSN memory by:
partitioning the data object into a plurality of data segments;

for each of the plurality of data segments, generating a plurality of encoded data slices based on an error encoding dispersal function; and assigning a slice name to each of the plurality of encoded data slices, wherein the slice name includes a vault identifier that identifies a virtual DSN address space associated with the user device, storing the plurality of encoded data slices in the DSN memory, a slice index based on the vault identifier and a pillar identifier that identifies a pillar associated with a data slice; and a source data name containing an identifier of the data object.

17. The user device of claim 16, wherein the processing module is operable to generate a file name for the data object, wherein the file name includes a domain name for the DSN memory, a data object name and a file type identifier.

18. The user device of claim 17, wherein the processing module is operable to store the plurality of encoded data slices in the DSN memory by:

assigning the plurality of encoded data slices to a plurality of pillars of the DSN memory for storing the data object, wherein a data slice of each of the plurality of data segments of the data object is assigned to one of the pillars of the plurality of pillars.

* * * * *